(12) United States Patent
Tsujii (10) Patent No.: US 8,837,021 B2
(45) Date of Patent: Sep. 16, 2014

(54) IMAGE PROCESSING APPARATUS, CONTROL METHOD, AND COMPUTER-READABLE MEDIUM

(75) Inventor: Takaya Tsujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 792 days.

(21) Appl. No.: 13/023,209

(22) Filed: Feb. 8, 2011

(65) Prior Publication Data

US 2011/0228363 A1 Sep. 22, 2011

(30) Foreign Application Priority Data

Mar. 16, 2010 (JP) ................. 2010-059927

(51) Int. Cl.
*G06F 15/00* (2006.01)
*G06K 1/00* (2006.01)
*G03F 3/08* (2006.01)
*H04N 1/40* (2006.01)
*G06K 9/00* (2006.01)
*H04N 1/64* (2006.01)

(52) U.S. Cl.
CPC .................................. H04N 1/644 (2013.01)
USPC ........... 358/518; 358/1.9; 358/3.24; 358/3.21; 358/2.1; 382/162; 382/165; 382/166; 382/167; 382/181; 382/232; 382/276

(58) Field of Classification Search
USPC ........ 358/1.6, 1.9, 2.1, 3.06, 3.24, 3.26, 3.27, 358/1.13, 1.16, 1.17, 1.18, 515, 517, 518, 358/520, 523, 524, 530, 531, 535, 537, 538, 358/539; 382/162, 166, 167, 232, 233, 274, 382/299, 239, 224, 195
See application file for complete search history.

(56) References Cited

U.S. PATENT DOCUMENTS

| 5,270,827 | A | * | 12/1993 | Kobayashi et al. | .......... 358/3.02 |
| 5,933,249 | A | | 8/1999 | Shimura et al. | |
| 6,243,416 | B1 | * | 6/2001 | Matsushiro et al. | .......... 375/240 |
| 7,505,624 | B2 | * | 3/2009 | Ogden et al. | .................. 382/166 |

(Continued)

FOREIGN PATENT DOCUMENTS

JP 7-236062 9/1995
JP 10-257488 9/1998

(Continued)

OTHER PUBLICATIONS

U.S. Appl. No. 13/023,215, filed Feb. 8, 2011 by Hideyasu Tomi.

(Continued)

*Primary Examiner* — Firmin Backer
*Assistant Examiner* — Jonathan Beckley
(74) *Attorney, Agent, or Firm* — Fitzpatrick, Cella, Harper & Scinto (57) ABSTRACT

An image processing apparatus which converts input image data into a designated color, the apparatus comprises a designation unit which accepts a designated color from a user; a holding unit which holds a representation color of a block, a color layout of pixels included in the block, and an other color contained in the block except for the representation color, the block being generated by compression and including a predetermined number of pixels that form the image data; and a color conversion unit which mono-colorizes the block into the designated color by converting at least one of the representation color and the other color into the designated color designated with the designation unit in accordance with the color layout.

9 Claims, 11 Drawing Sheets

(56) References Cited

U.S. PATENT DOCUMENTS

| | | |
|---|---|---|
| 7,844,120 B2 | 11/2010 | Yamamoto |
| 8,331,705 B2 * | 12/2012 | Shiraishi et al. ............. 382/238 |
| 2002/0113898 A1 | 8/2002 | Mitsuhashi .................. 348/578 |
| 2005/0219660 A1 * | 10/2005 | Atsumi et al. ............... 358/518 |
| 2011/0158522 A1 | 6/2011 | Tsujii ........................... 382/166 |
| 2011/0229027 A1 | 9/2011 | Shibuya ....................... 382/166 |

FOREIGN PATENT DOCUMENTS

| | | |
|---|---|---|
| JP | 10-290391 | 10/1998 |
| JP | 2000-358194 | 12/2000 |
| JP | 2002-271791 | 9/2002 |
| JP | 2004-104621 | 4/2004 |
| JP | 2007-143082 | 6/2007 |

OTHER PUBLICATIONS

U.S. Appl. No. 13/028,256, filed Feb. 16, 2011 by Yuichiro Shibuya.

U.S. Appl. No. 13/085,608, filed Apr. 13, 2011 by Hideyasu Tomi.

U.S. Appl. No. 13/111,126, filed May 19, 2011 by Yuichiro Shibuya.

* cited by examiner

IMAGE

| | |
|---|---|
|  | SAME COLOR FOR ALL PIXELS : ONE PATTERN |
|  | TWO COLORS: SEVEN PATTERNS |
|  | THREE COLORS: SIX PATTERNS |
|  | DIFFERENT COLORS FOR ALL PIXELS: ONE PATTERN |

FIG. 4

| IMAGE | FLAG |
|:---:|:---:|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

| IMAGE | 1-2 bit 0 | 1-3 bit 1 | 1-4 bit 2 | 2-3 bit 3 | 2-4 bit 4 | 3-4 bit 5 | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

Reference layout: cells labeled 1,2,3,4 (top-left, top-right, bottom-left, bottom-right).

F I G. 10A $$\begin{pmatrix} R' \\ G' \\ B' \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix}$$

F I G. 10B $$\begin{pmatrix} C' \\ M' \\ Y' \\ K' \end{pmatrix} = \begin{pmatrix} a11 & a12 & a13 & a14 \\ a21 & a22 & a23 & a24 \\ a31 & a32 & a33 & a34 \\ a41 & a42 & a43 & a44 \end{pmatrix} \begin{pmatrix} C \\ M \\ Y \\ K \end{pmatrix}$$

IMAGE PROCESSING APPARATUS, CONTROL METHOD, AND COMPUTER-READABLE MEDIUM

BACKGROUND OF THE INVENTION

1. Field of the Invention

The present invention relates to an image processing apparatus, control method, and computer-readable medium for performing color conversion processing into a designated color.

2. Description of the Related Art

An image processing apparatus has been conventionally proposed which converts image data input to the image processing apparatus into a single fixed color such as yellow, magenta, cyan, black, red, green, or blue, and outputs the converted color data. Such image processing apparatuses are widely used for mono-color output.

An image processing apparatus receives image data by receiving and interpreting PDL data (Page Description Language data), or by reading a document by an image reading apparatus. In some cases, such image data are sequentially generated together with accompanying information while being divided into small block regions. The generated image data divided into small regions sequentially undergo image processing based on the accompanying information, compressed, and saved in a memory. Since image data is compressed and saved in the memory, the memory can be saved (see, for example, Japanese Patent Laid-Open No. 2004-104621).

Conventionally, color conversion into a mono-color is performed by converting the pixel value of image data after decompressing the compressed image data. The values of all pixels are then converted into a designated color, implementing mono-color output.

However, in conversion into a designated color by software, the software conventionally decompresses compressed image data and changes the pixel value. This prolongs the processing time, inhibiting an increase in throughput.

SUMMARY OF THE INVENTION

The present invention has been made to solve the above problems, and provides an image processing apparatus capable of quickly converting compressed image data into a designated color.

According to one aspect of the present invention, there is provided an image processing apparatus which converts input image data into a designated color, the apparatus comprising: a designation unit which accepts a designated color from a user; a holding unit which holds a representation color of a block, a color layout of pixels included in the block, and an other color contained in the block except for the representation color, the block being generated by compression and including a predetermined number of pixels that form the image data; and a color conversion unit which mono-colorizes the block into the designated color by converting at least one of the representation color and the other color into the designated color designated with the designation unit in accordance with the color layout.

According to another aspect of the present invention, there is provided a method of controlling an image processing apparatus which converts input image data into a designated color, the method comprising: a designation step of causing a designation unit of the image processing apparatus to accept a designated color from a user; a holding step of causing a holding unit of the image processing apparatus to hold a representation color of a block, a color layout of pixels included in the block, and an other color contained in the block except for the representation color, the block being generated by compression and including a predetermined number of pixels that form the image data; and a color conversion step of causing a color conversion unit of the image processing apparatus to mono-colorize the block into the designated color by converting at least one of the representation color and the other color into the designated color designated with the designation unit in accordance with the color layout.

According to another aspect of the present invention, there is provided a computer-readable medium storing a program for causing a computer to function as a designation unit which accepts a designated color from a user, a holding unit which holds a representation color of a block, a color layout of pixels included in the block, and an other color contained in the block except for the representation color, the block being generated by compression and including a predetermined number of pixels that form the image data, and a color conversion unit which mono-colorizes the block into the designated color by converting at least one of the representation color and the other color into the designated color designated with the designation unit in accordance with the color layout.

Further features of the present invention will become apparent from the following description of exemplary embodiments (with reference to the attached drawings).

DESCRIPTION OF THE EMBODIMENTS

First Embodiment

Figure 1:
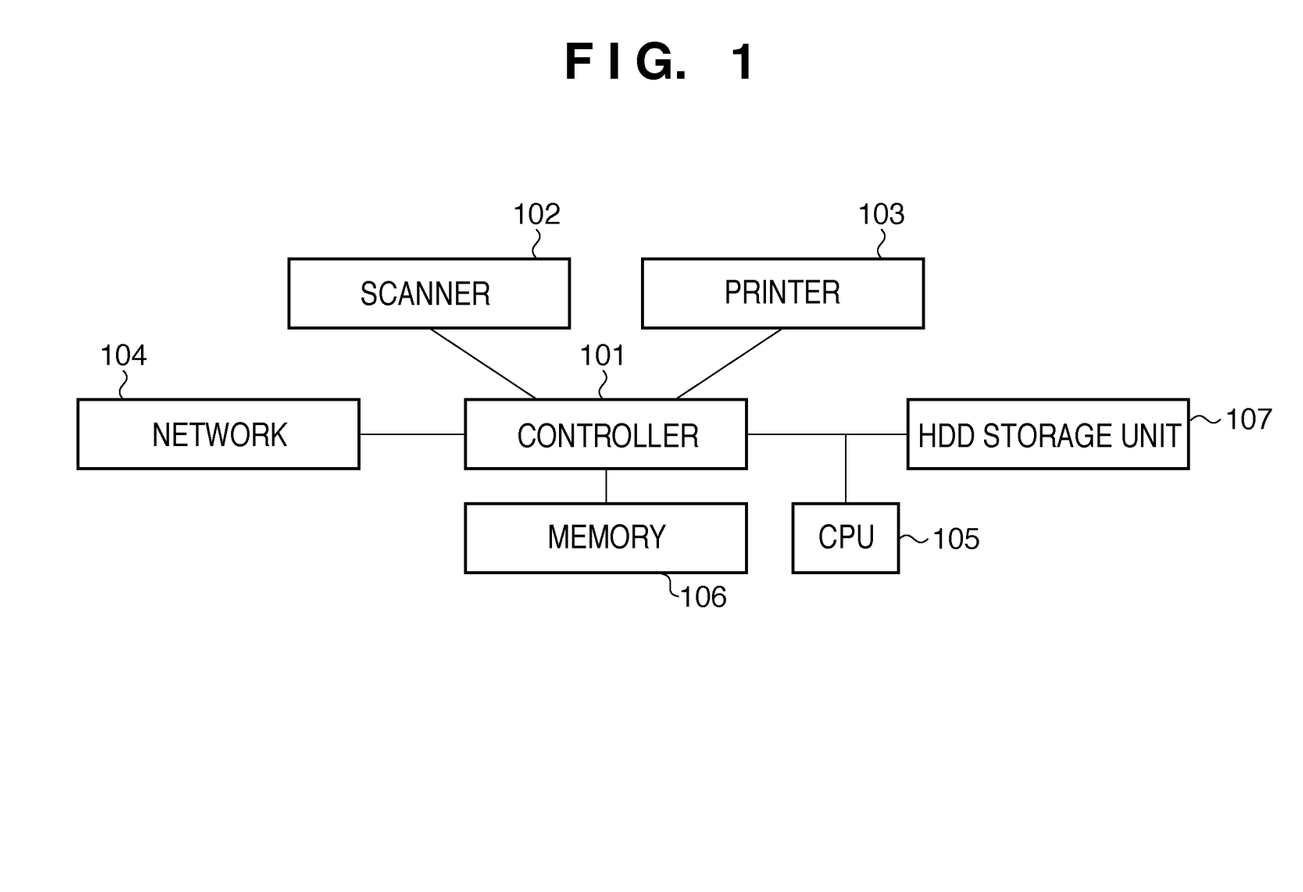
FIG. 1 is a block diagram showing an outline of an MFP system.

Embodiment of the present invention will now be described in detail with reference to the accompanying drawings. Note that the same reference numerals denote the same parts, and a repetitive description thereof will be omitted. FIG. 1 is a block diagram showing the overall configuration of a digital multi-functional system (to be referred to as an MFP) which performs scanning, printing, and copying according to the first embodiment of the present invention. A controller 101 is connected to a scanner 102 serving as an image input device, and a printer 103 serving as an image output device. Further, the controller 101 is connected to a network 104 such as a LAN or public line (WAN) to input/output image information and device information, and expands the image of PDL data.

A CPU 105 is a processor that controls the overall system. A memory 106 is a system work memory for operating the CPU 105, and is an image memory to temporarily store image data. An HDD storage unit 107 is a hard disk drive which stores system software and image data.

Figure 2:
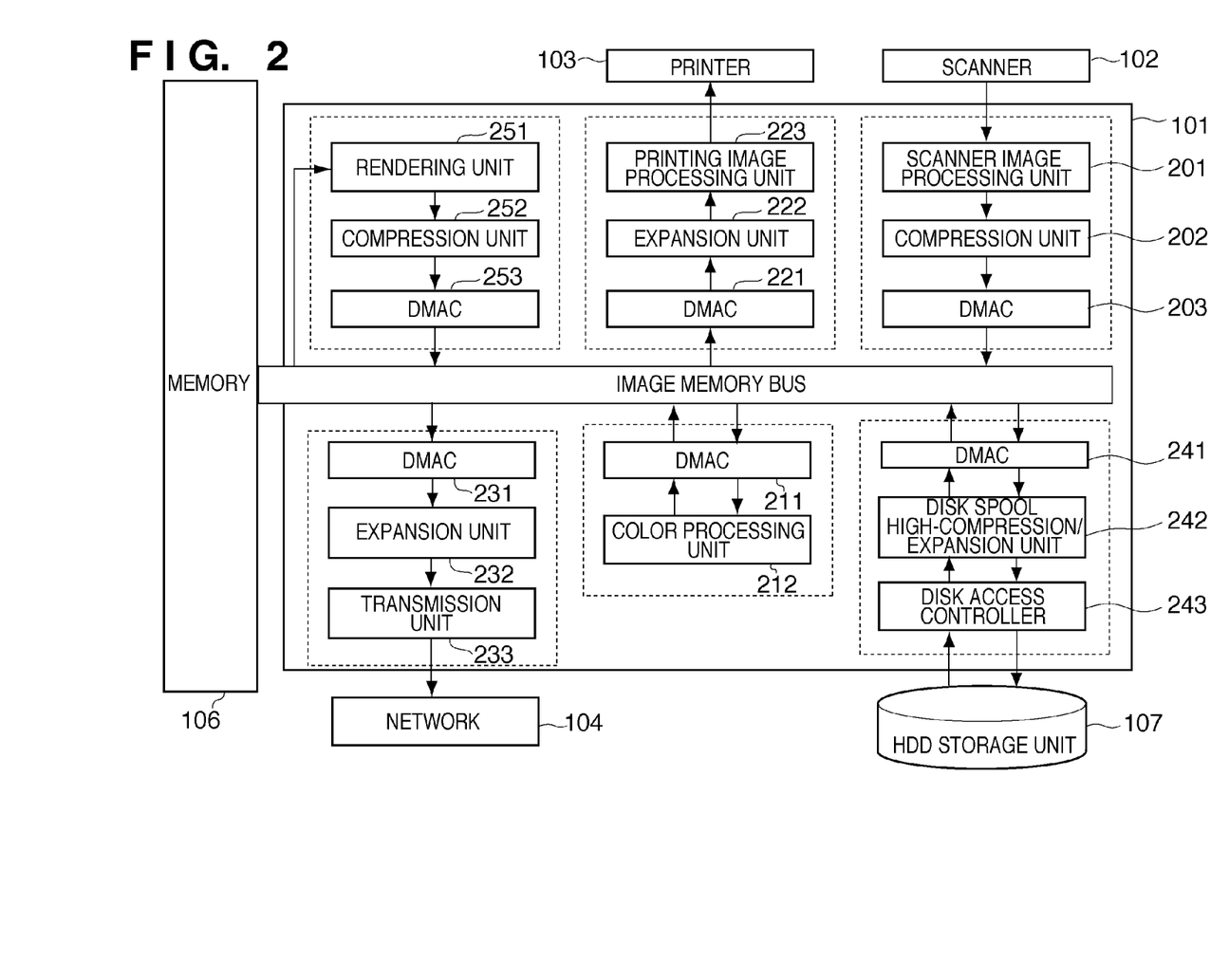
FIG. 2 is a block diagram showing an outline of a controller.

The operation of the controller 101 in FIG. 1 will be described in detail with reference to FIG. 2. A case in which scan data is to be loaded will be explained. When the controller 101 receives read image data of three, R (Red), G (Green), and B (Blue) colors from the scanner 102, a scanner image processing unit 201 performs image processes such as shading processing and filter processing, and a compression unit 202 performs image compression processing. The compressed data are stored in the memory 106 via a DMAC (Direct Memory Access Controller) 203.

When printing scan data, compressed data stored in the memory 106 are input to a color processing unit 212 via a DMAC 211 to convert them into a CMYK (Cyan, Magenta, Yellow, blacK) color space. The converted C, M, Y, and K values undergo adjustment color processes such as density adjustment and printer gamma correction, and are stored again in the memory 106 via the DMAC 211. To perform printing image processing, the compressed data stored in the memory 106 are loaded via a DMAC 221, and expanded into raster image data by an expansion unit 222. A printing image processing unit 223 receives the C, M, Y, and K raster image data, performs area coverage modulation processing based on a dither method or error diffusion method, and outputs the resultant image data to the printer 103.

When transmitting scan data to the network 104, compressed data stored in the memory 106 are input to the color processing unit 212 via the DMAC 211 to perform color conversion. More specifically, the compressed data are converted into a YCbCr (luminance, blue color difference, red color difference) color space after display gamma adjustment, paper background color adjustment, and the like. The converted data are stored again in the memory 106 via the DMAC 211. To perform transmission image processing, the compressed data stored in the memory 106 are loaded via a DMAC 231, and expanded into raster image data by an expansion unit 232. A transmission unit 233 executes JPEG compression processing the Y, Cb, and Cr raster image data in color image transmission, or executes binarization, JBIG compression, or the like for the Y data in monochrome binary image transmission. Thereafter, the transmission unit 233 outputs the image data to the network 104.

When saving scan data, compressed data stored in the memory 106 are input to a disk spool high-compression/expansion unit 242 via a DMAC 241. Since the HDD write speed is lower than that for the memory, the disk spool high-compression/expansion unit performs higher JPEG compression. The compressed data are then saved in the HDD storage unit 107 via a disk access controller 243.

When expanding saved data again into the memory, conversion processing reverse to the above-described one is done. A case in which PDL data is to be written in the memory will be explained. Although not shown in FIG. 2, the CPU 105 interprets PDL data sent from the network 104 in FIG. 1 and outputs a display list to the memory 106. A rendering unit 251 renders the display list stored in the memory 106 into R, G, and B raster image data or C, M, Y, and K raster image data.

A compression unit 252 executes image compression processing. The compressed data are stored in the memory 106 via a DMAC 253.

Transmission/save of PDL image data to/in the printer 103 or network 104 can be achieved by performing the same processing as that for scan data.

An instruction from the user can also be accepted via the network 104. For example, even a designated color for color conversion is also acquired from the user via the network 104.

[Compression Processing]

Details of the raster image data compression unit, which is a feature of the embodiment, will be described. First, a raster image of each page is divided into blocks each of 2×2 pixels, and data of each divided and extracted block is compressed. Prior to a description of the processing, the number of combination cases depending on the number of colors in data of 2×2=4 pixels will be examined. Since the number of pixels is four, the maximum number of colors in these pixels is four, and the block has combinations of one to four colors at most. The number of possible combination cases for patterns of these four colors will be explained with reference to FIG. 3. In the embodiment, the first color will also be called a representation color, and the second to fourth colors other than the representation color will also be called other colors. Also in the embodiment, the color of the upper left pixel in a block of 2×2 pixels is determined as a representation color (first color). Accordingly, the representation color is determined. However, the method is not limited to this, and the color of another pixel may be determined as a representation color, as needed. When the block contains colors different from the representation color, these colors are determined as other colors. In this way, other colors are determined.

Figure 3:
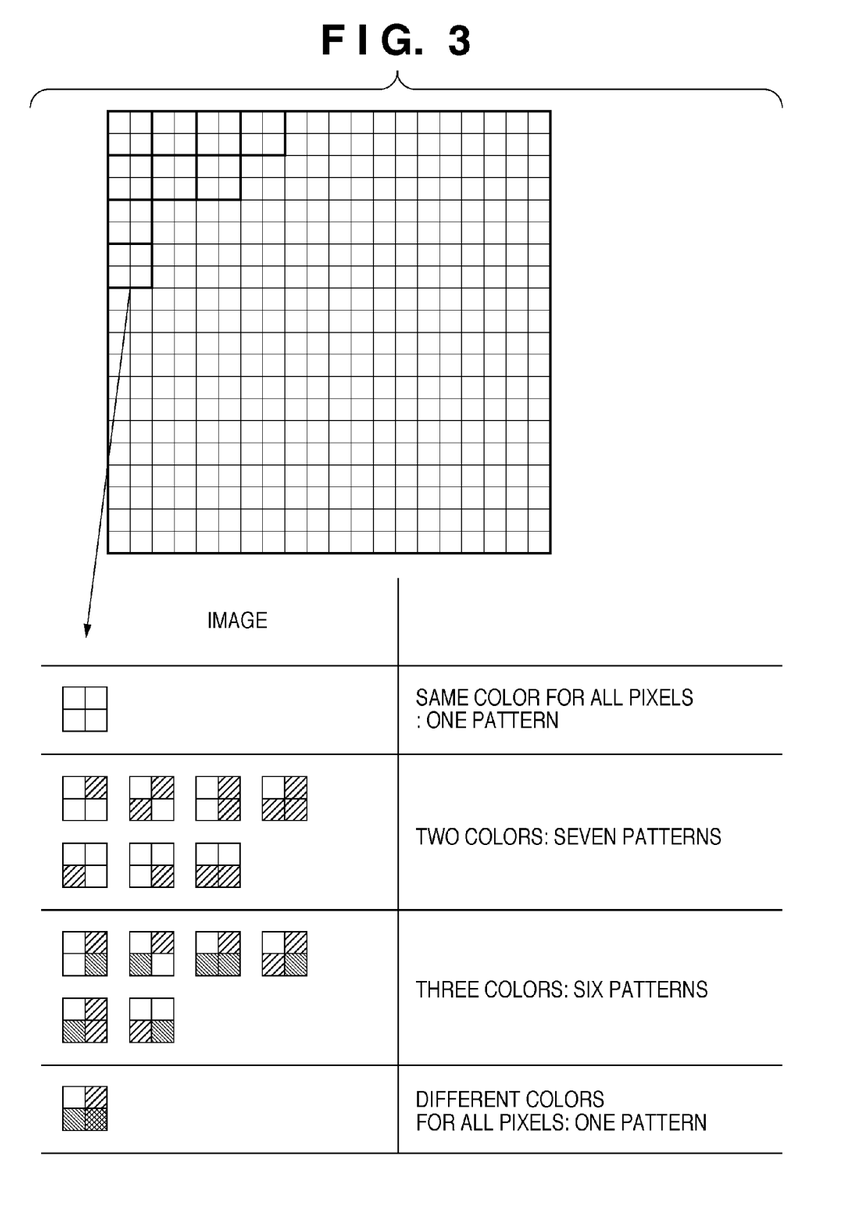
FIG. 3 is a view showing a list of patterns for a block when an image is divided into blocks.

When the block has one color, the four pixels are formed in the same color, and the number of combinations is one. A case in which the block has two colors will be examined. As for the number of cases in which two colors are laid out in the four pixels, assuming that the color of the upper left pixel is the first color and the other color is the second color, the first or second color is laid out in three pixels except for the upper left pixel. Thus, a total of seven combinations except for a case in which the four pixels are formed in the same color are considered.

Next, a case in which the block has three colors will be considered. The number of cases in which three colors are laid out in the four pixels can translate into the number of cases in which only one of the three colors is used twice. It suffices to obtain the number of cases in which two pixels out of the coordinate points of the four pixels have the same color. That is, the number of cases for three colors corresponds to the number of combinations of two coordinate points out of the four coordinate points, and is six in total. As for a case in which the block has four colors, there is only one pattern, similar to the case in which the block has one color.

Figure 4:
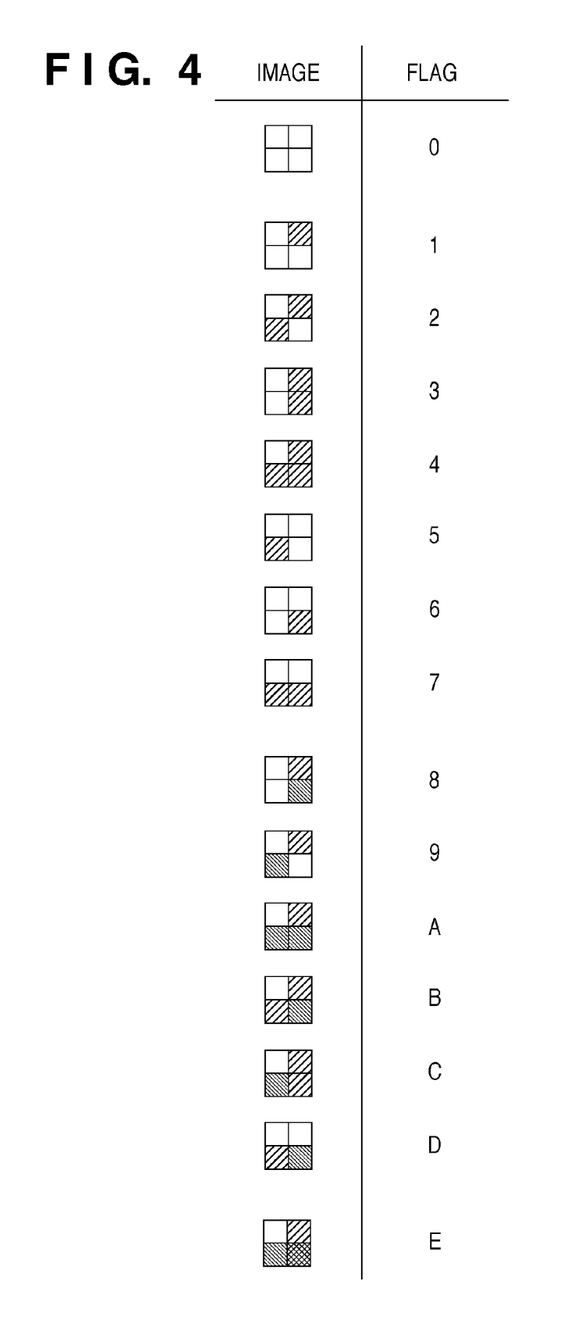
FIG. 4 is a view showing a list of block patterns and their identifiers.

By adding the numbers of cases for one to four colors, a total of 15 patterns are conceivable. To assign a flag (identifier) for identifying all these patterns, the data amount needs to be 4 bits. This is illustrated as in FIG. 4, and the flag indicating the color layout will be called a "pattern flag". In this manner, the pattern flag is determined to determine the color layout.

Figure 5:
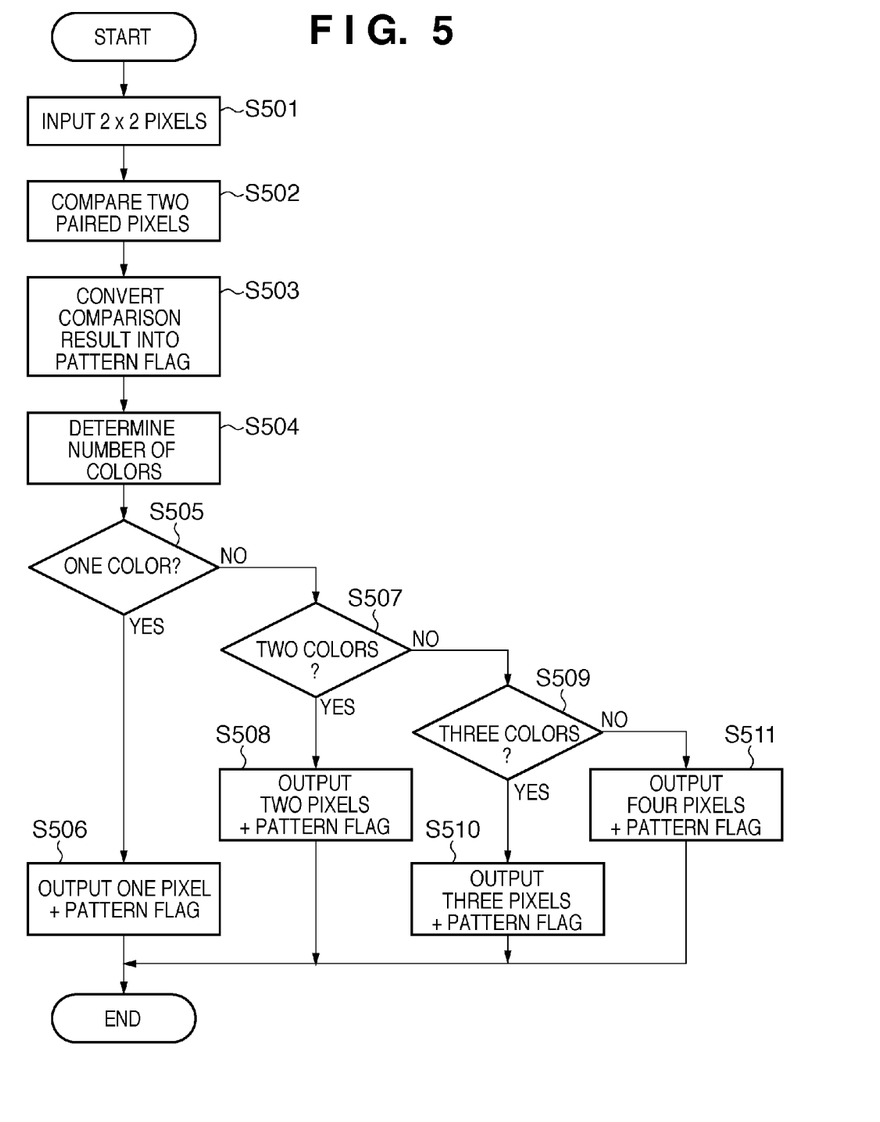
FIG. 5 is a flowchart showing an image compression sequence according to the first embodiment.

The sequence of processing executed by the compression units 202 and 252 in consideration of these possible combinations of 2×2 pixels will be described with reference to FIG. 5. In the following description, the input is an input image having 256 tone levels of 8 bits for each of R, G, and B. The data is dot-sequential 8-bit data for a 24-bit image per pixel. Note that the input may be implemented with the format of, for example, a 32-bit image per pixel at 256 tone levels of 8 bits for each of C, M, Y, and K.

Figure 6:
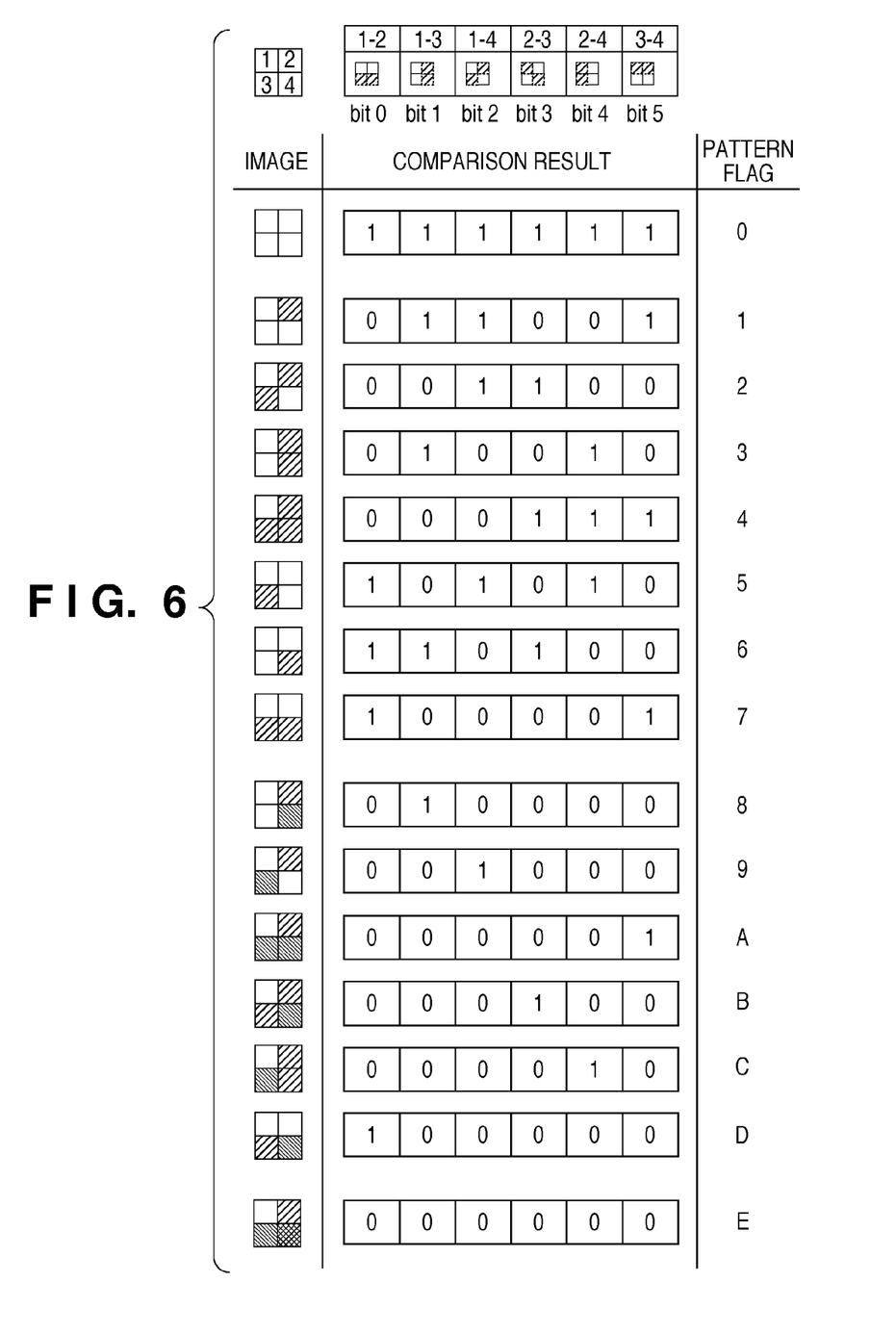
FIG. 6 is a view showing conversion of a block pattern into a flag.

First, a block of 2×2 pixels is input (step S501), and 24-bit comparison is done for all combinations of two pixels in the block (step S502). If all the bits match each other as a result of the comparison, 1 is output, and if they do not match each other, 0 is output. In this case, coordinate points 1, 2, 3, and 4 are defined in order of upper left, upper right, lower left, and lower right in the 2×2 pixels, as shown in FIG. 6. There are six pairs of two pixels, that is, 1-2, 1-3, 1-4, 2-3, 2-4, and 3-4, so comparison needs to be executed six times, outputting a 6-bit result. For example, when all the pixels have the same color, all the comparison results are output as 1. To the contrary, when all the four pixels have different pixel values, all the comparison results are output as 0. As described above, the number of patterns which may occur in the four pixels depending on the color match is 15. Thus, the 6-bit comparison result can be converted into a 4-bit pattern flag (step S503).

Figure 7:
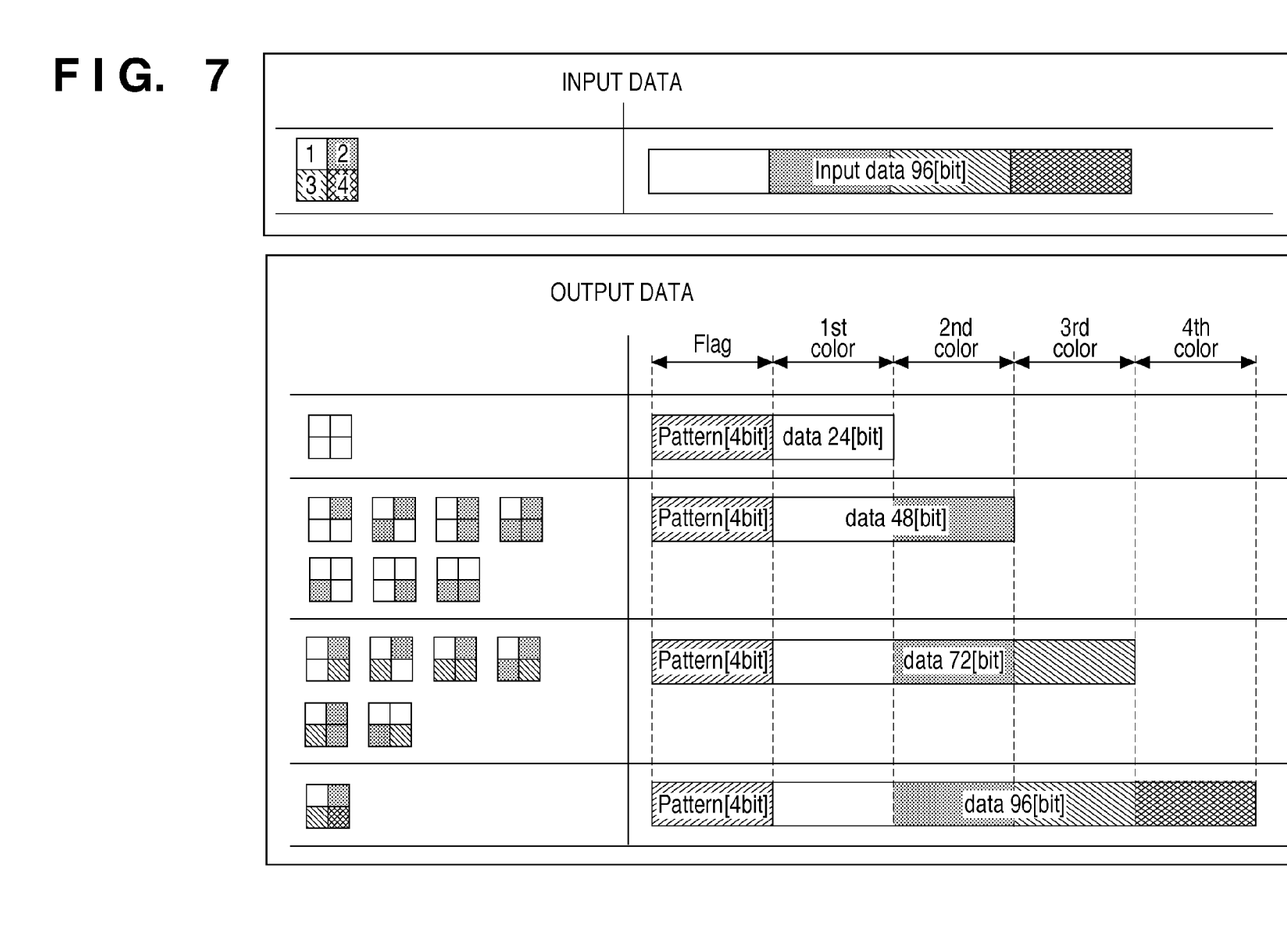
FIG. 7 is a view showing the relationship between the input and the output in compression processing according to the first embodiment.

Subsequently for conversion into the 4-bit pattern flag, the number of colors which appear in the four pixels, and the color data are extracted (step S504). The positions of the second and subsequent colors can be obtained from the pattern flag when the upper left color is defined as the first color. This will be explained with reference to FIG. 7. For example, if it is finalized that the four pixels are formed in one color, none of the second and subsequent colors exists, so 4 bits of the pattern flag and 24 bits of the first color are output (step S506). If it is finalized that the four pixels are formed in two colors (step S507), the coordinate point of the second color is calculated based on the pattern flag, and 4 bits of the pattern flag and 48 bits of the pixel values of the two colors are output (step S508). The same processing is done even when pixels are formed in three or four colors (steps S509, S510, and S511). At this time, color data which have not appeared before are stored in order of coordinate points (1, 2, 3, and 4 in order of upper left, upper right, lower left, and lower right) in the block.

In this fashion, a 4-bit pattern flag, and pixel values by only the number of colors present in a block of 2×2 pixels are output with respect to 96-bit input data of four colors in the block. This can reduce the output data amount by relatively simple processing. By referring to the pattern flag, the number of colors in the block can be specified. This processing can be executed for all image blocks, compressing data of the entire image.

Figure 8:
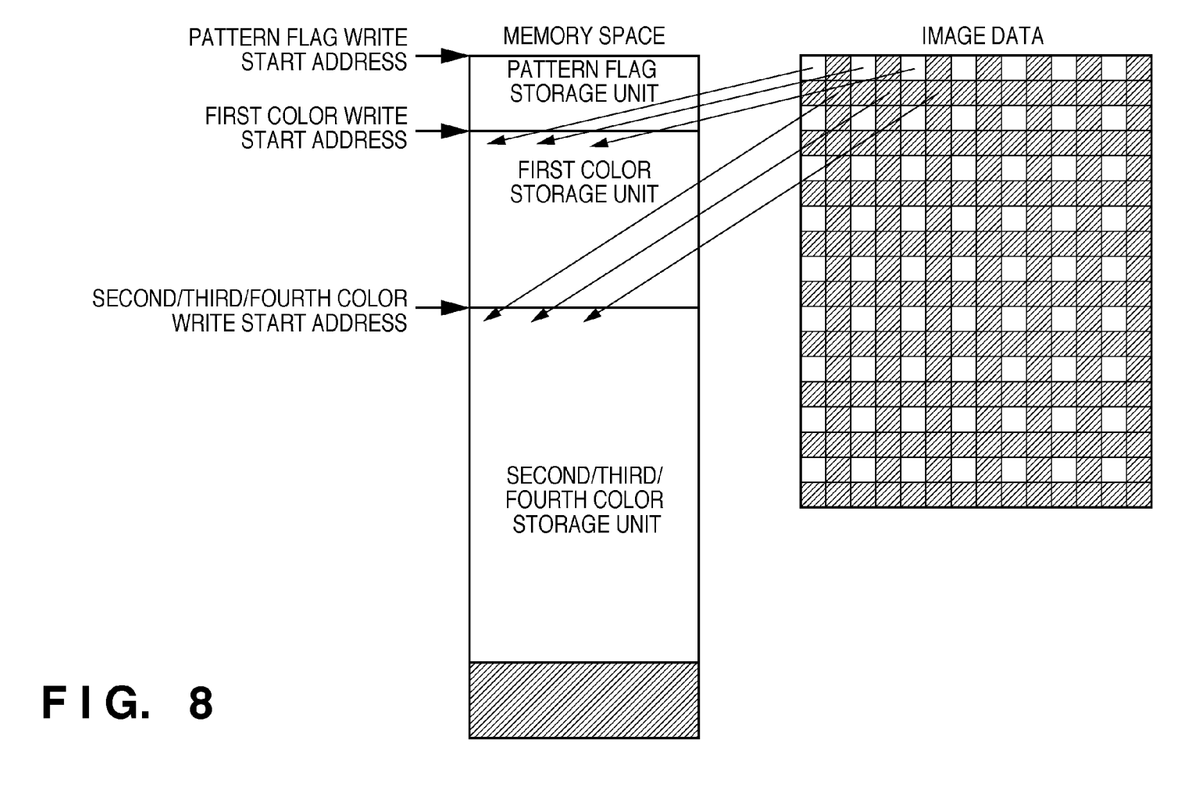
FIG. 8 is a view showing the layout of compressed data in the memory space according to the first embodiment.

The obtained pattern flag and color data are written in the memory via the DMAC. At this time, the write position is changed between the pattern flag, the first color data, and the second, third, and fourth color data. The DMAC is instructed of three addresses respectively indicating a memory start address for writing the pattern flag, a memory start address for writing the first color data, and a memory start address for writing the second, third, and fourth color data. In the memory space, compressed data are respectively stored in different areas serving as the pattern flag storage unit, first color storage unit, and second/third/fourth color storage unit. More specifically, the representation color is stored in the first color storage unit, and other colors are stored in the second/third/fourth color storage unit. FIG. 8 exemplifies a structure which holds each information. For example, when 8-bit images of R, G, and B colors in M×N pixels are input to the comparison unit, the data size of the pattern flag is M×N/8 bytes, and that of the first color is M×N×¾ bytes. The data size of the second, third, and fourth colors is indefinite depending on the image (changes depending on the image).

In a memory area subsequent to the first color write position, pixel data are stored without quantizing or encoding each pixel. That is, the pixel value of a pixel which forms compressed image data can be determined by referring to a generated pattern flag and pixel color data.

[Mono-Colorization]

Figure 9:
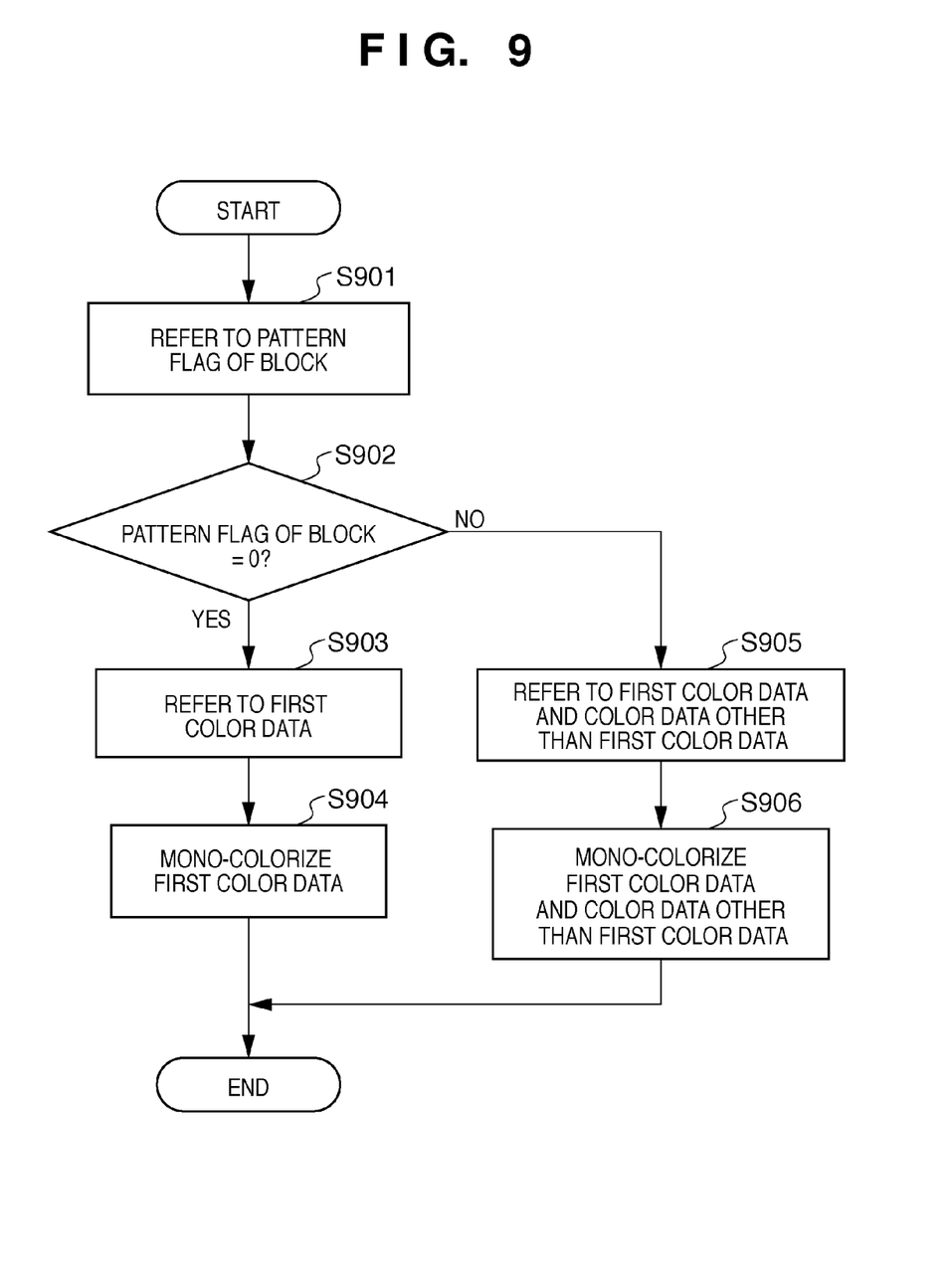
FIG. 9 is a flowchart showing a mono-colorization sequence according to the first embodiment.
Figure 10A:
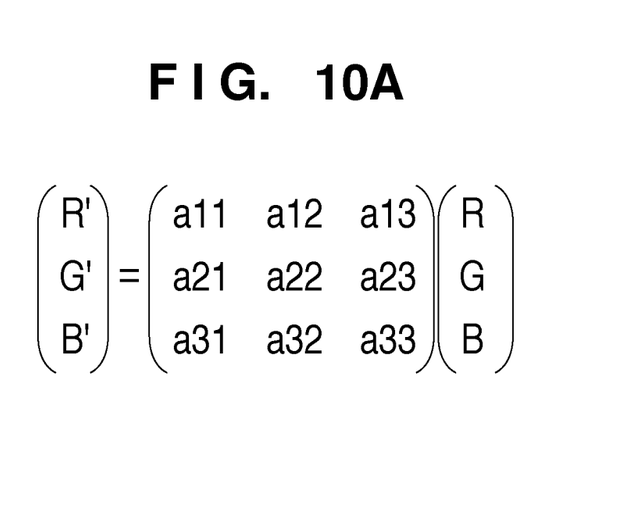
FIGS. 10A and 10B are views each showing a color conversion matrix according to the present invention.

An image mono-colorization sequence processed by the CPU 105 will be explained with reference to FIG. 9. Assume that information about a color designated by the user has already been held in the memory 106 or the like. First, the pattern flag of a block is referred to from the pattern flag storage unit of compressed image data stored in the memory 106 (step S901). It is then determined whether the pattern flag is 0 (step S902). If it is determined in step S902 that the pattern flag is 0, the first color data area is referred to (step S903). The first color data value undergoes, for example, matrix calculation shown in FIG. 10A, performing color conversion so that the first color is mono-colorized into the color designated by the user (step S904). In the matrix shown in FIG. 10A, R, G, and B are inputs, R', G', and B' are outputs, and a11, a12, a13, a21, a22, a23, a31, a32, and a33 are coefficients. This calculation can give the coefficients to obtain the color designated by the user. Note that the matrix used here is not limited to this and may be changed, as needed. The color designated with the designation unit may be any one or two of R, G, and B. In any case, designated color information is held in the memory 106 and used in the color conversion.

If it is determined in step S902 that the pattern flag takes a value other than 0, colors which form the block are determined based on the pattern flag value, and the first color data storage unit and the data storage unit of a color other than the first color are referred to based on the number of building colors (step S904). Calculation is done for the data value of the first color and that of the color other than the first color, executing mono-colorization (step S905). By mono-colorizing all blocks, the entire page is mono-colorized.

Next, the expansion units 222 and 232 which are paired with the compression units 202 and 252 will be explained. The expansion units 222 and 232 execute processing of returning the foregoing pattern flag and pixel data into original raster image data. The DMAC is instructed of three addresses respectively indicating the pattern flag write start address, first color write start address, and second/third/fourth color write start address of compressed data which are arranged in the memory as shown in FIG. 8. The DMAC reads out data from these three addresses, and inputs them to the expansion unit 222 or 232. First, the expansion unit 222 or 232 interprets the 4-bit pattern flag, and calculates the number of colors in the block. In addition to the first color data, the second, third, and fourth color data are read out in accordance with the number of colors, and the pixel data are arranged again in accordance with the pattern flag shape. As a result, the block of 2×2 pixels is expanded and decoded. The decoded image data are output by printing them or transmitting them to the network.

The above-described arrangement can reduce the load of mono-color image determination processing by a relatively simple compression method. The pixel value of image data need not be changed after decompressing the image data. Color conversion into a designated color becomes possible by only changing the pixel values of representation and other colors in compressed image data. Hence, designated color output can be implemented without decreasing the image data input/output speed.

In the first embodiment, a block in image data is processed for every predetermined number of pixels, that is, 2×2 pixels.

However, the present invention is not limited to this, and if necessary, the size may be changed in accordance with the characteristic of image data to be processed and the like. In this case, the pattern flag and the number of handled colors also change. A plurality of blocks may be handled at once as a group.

Second Embodiment

The second embodiment will explain another example of mono-colorization described in the first embodiment. When a color designated by the user matches the color of a pixel in image data, this pixel need not be mono-colorized, so unnecessary processing can be omitted. Especially when image data which has been rendered into the CMYK color space and is stored in a memory 106 via a comparison unit has the CMYK image format, the performance can be greatly improved. This is because a YMCK image is larger in size than an RGB image, and the effect of omitting color conversion processing for unnecessary pixel data in mono-colorization is significant.

Figure 11:
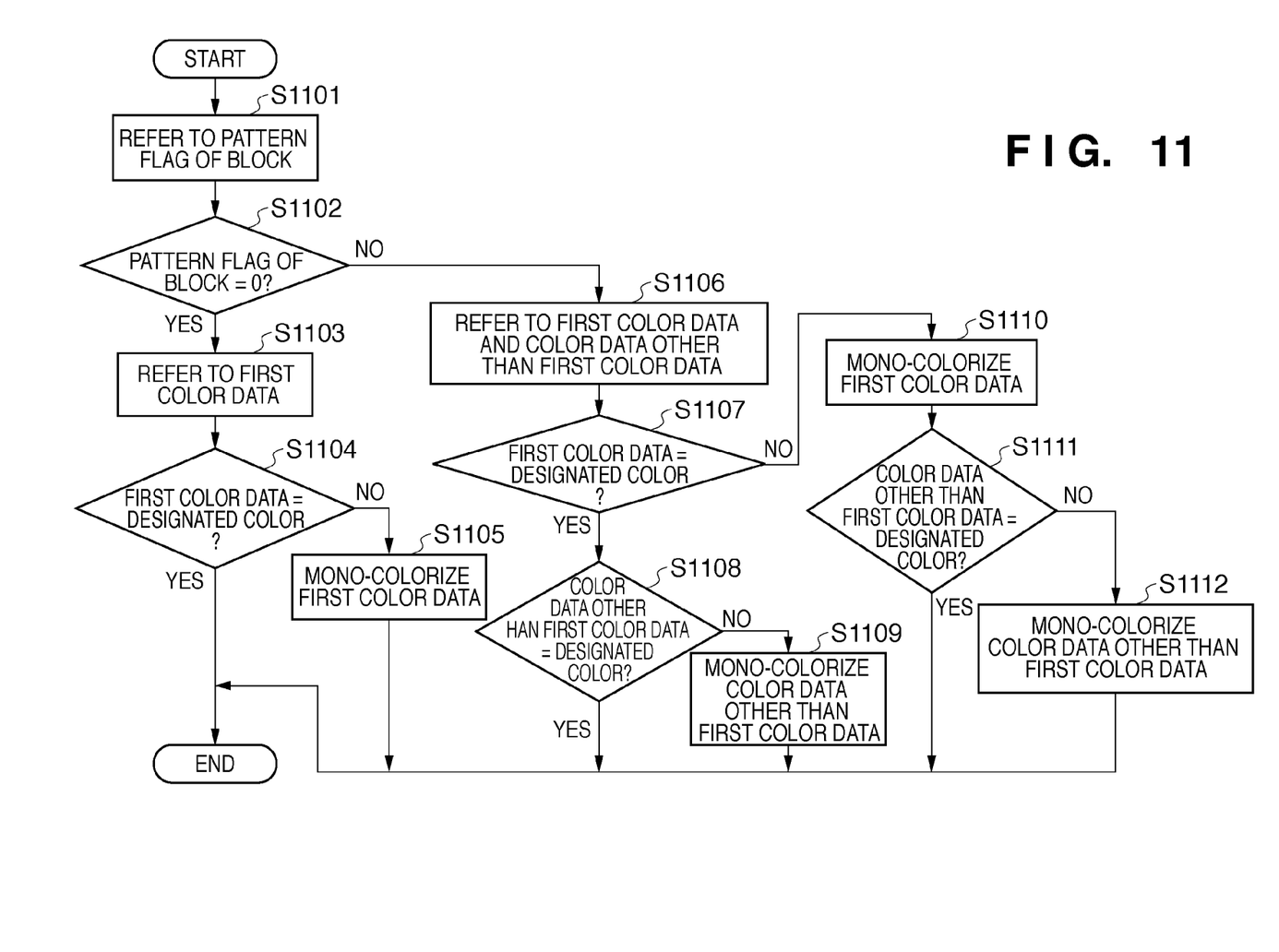
FIG. 11 is a flowchart showing a mono-colorization sequence according to the second embodiment.

The second embodiment will describe a method of performing color conversion processing when image data to be processed has the CMYK image format, and a color designated by the user does not match the color of a pixel in image data, unlike the mono-colorization method described in the first embodiment. FIG. 11 shows a processing sequence in the second embodiment. Assume that information about a color designated by the user has already been held in the memory 106.

Figure 10B:
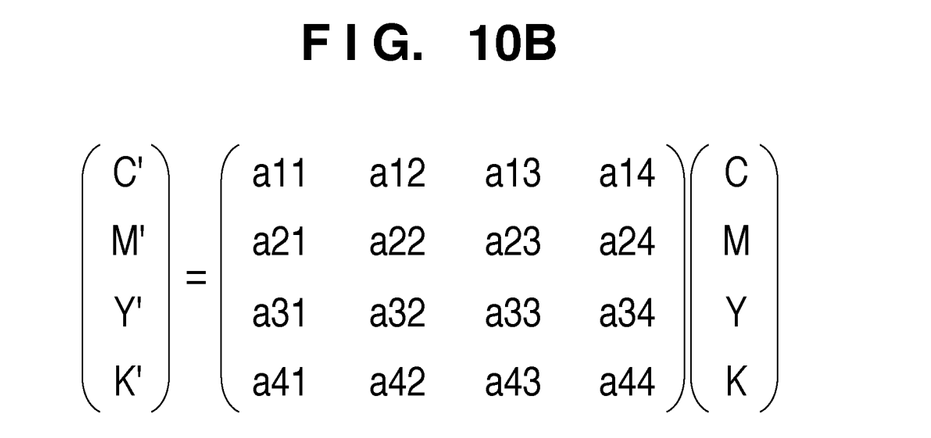

First, the pattern flag of a block is referred to from the pattern flag storage unit of compressed image data stored in the memory 106 (step S1101). It is then determined whether the pattern flag is 0 (step S1102). If it is determined in step S1102 that the pattern flag is 0, the first color data storage unit is referred to (step S1103). It is determined whether the first color data value matches the color designated by the user (step S1104). If the first color data value matches the color designated by the user, the processing for the block ends without performing color conversion. If the first color data value does not match the color designated by the user, matrix calculation is executed using, for example, a matrix shown in FIG. 10B, performing color conversion so that the first color is mono-colorized into the color designated by the user (step S1105). In the matrix shown in FIG. 10B, C, M, Y, and K are inputs, C', M', Y', and K' are outputs, and a11 to a14, a21 to a24, a31 to a34, and a41 to a44 are coefficients. For example, in conversion into C mono-color, all a21 to a24, a31 to a34, and a41 to a44 become "0", and only a11 to a14 have values corresponding to the designated color. This calculation can give the coefficients to obtain the color designated by the user. Note that the matrix used here is not limited to this and may be changed, as needed. The color designated with the designation unit may be one, or two or more of C, M, Y, and K. In any case, designated color information is held in the memory 106 and used in the color conversion.

If it is determined in step S1102 that the pattern flag takes a value other than 0, colors which form the block are determined based on the pattern flag value, and the first color data area and the data area of a color other than the first color are referred to based on the number of building colors (step S1106). After that, it is determined whether the first color data value matches the color designated by the user (step S1107). If the first color data value matches the color designated by the user, no color conversion is done, and it is determined whether a data value stored in the data area of the color other than the first color matches the color designated by the user (step S1108). If the data value stored in the data area of the color other than the first color matches the color designated by the user, the processing for the block ends without performing color conversion. If the data value stored in the data area of the color other than the first color does not match the color designated by the user, the data value of the color other than the first color is mono-colorized by performing calculation (step S1109).

If it is determined in step S1107 that the first color data value does not match the color designated by the user, the first color data value is mono-colorized by performing calculation (step S1110). It is then determined whether a data value stored in the data area of the color other than the first color matches the color designated by the user (step S1111). If the data value stored in the data area of the color other than the first color matches the color designated by the user, the processing for the block ends without performing color conversion. If the data value stored in the data area of the color other than the first color does not match the color designated by the user, the data value of the color other than the first color is mono-colorized by performing calculation (step S1112). By mono-colorizing all blocks, the entire page is mono-colorized.

As described above, when a color designated by the user matches the color of a pixel in image data, this pixel need not be mono-colorized, so unnecessary processing can be omitted in addition to the effects of the first embodiment.

According to the first and second embodiments described above, the image processing apparatus which performs designated color output such as mono-color output need not change the pixel value of image data after decompressing compressed image data. Color conversion into a designated color becomes possible by only changing the pixel values of representation and other colors in compressed image data. Thus, designated color output can be implemented without decreasing the image data input/output speed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059927, filed Mar. 16, 2010, which is hereby incorporated by reference herein in its entirety.

What is claimed is:
1. An image processing apparatus comprising:
a division unit constructed to divide an image into blocks each having a predetermined number of pixels;
a pattern flag determination unit constructed to determine a pattern flag indicating a color layout of pixels for each of the blocks;
a color determination unit constructed to determine, for each of the blocks, a representation color and other colors, wherein the other colors are different from the representation color;

a holding unit constructed to hold, as compressed image data, the pattern flag determined by the pattern flag determination unit, the representation color, and the other colors determined by the color determination unit;

a designation unit constructed to accept a designated color from a user; and a color conversion unit constructed to mono-colorize the compressed image data without decompressing the compressed image data by converting at least one of (a) the representation color and (b) one of the other colors into the designated color based on the pattern flag.

2. The apparatus according to claim 1, wherein said color conversion unit sets the representation color as a color conversion target for a pattern flag indicating that the entire block has the same color, and sets at least one of the representation color and the other color as a color conversion target for a pattern flag indicating that the block contains a plurality of colors.

3. The apparatus according to claim 1, wherein the block having the predetermined number of pixels is 2×2 pixels.

4. The apparatus according to claim 1, wherein said holding unit holds the color layout, the representation color, and the other color in respective different memory areas.

5. The apparatus according to claim 1, wherein said designation unit accepts one color as the designated color out of colors to undergo color conversion by said color conversion unit.

6. The apparatus according to claim 1, wherein said designation unit accepts two colors as the designated color out of colors to undergo color conversion by said color conversion unit.

7. The apparatus according to claim 1, further comprising a comparison unit constructed to compare the designated color designated with said designation unit and the representation color or other color held in said holding unit, wherein when the designated color matches the representation color or the other color, said color conversion unit does not convert the representation color or the other color, and when the designated color does not match the representation color or the other color, said color conversion unit converts at least one of the representation color and the other color.

8. A method of controlling an image processing apparatus, the method comprising:

a division step of causing a division unit of the image processing apparatus to divide an image into blocks each having a predetermined number of pixels;

a pattern flag determination step of causing a pattern flag determination unit of the image processing apparatus to determine a pattern flag indicating a color layout of pixels for each of the blocks;

a color determination step of causing a color determination unit of the image processing apparatus to determine, for each of the blocks, a representation color and other colors, wherein the other colors are different from the representation color;

a holding step of causing a holding unit of the image processing apparatus to hold, as compressed image data, the pattern flag determined by the pattern flag determination unit, the representation color, and the other colors determined in the color determination step;

a designation step of causing a designation unit of the image processing apparatus to accept a designated color from a user; and a color conversion step of causing a color conversion unit of the image processing apparatus to mono-colorize the compressed image data without decompressing the compressed image data by converting at least one of (a) the representation color and (b) one of the other colors into the designated color based on the pattern flag.

9. A non-transitory computer-readable storage medium storing a program for causing a computer to function as a division unit constructed to divide an image into blocks each having a predetermined number of pixels;

a pattern flag determination unit constructed to determine a pattern flag indicating a color layout of pixels for each of the blocks;

a color determination unit constructed to determine, for each of the blocks, a representation color and other colors, wherein the other colors are different from the representation color;

a holding unit constructed to hold, as compressed image data, the pattern flag determined by the pattern flag determination unit, the representation color, and the other colors determined by the color determination unit;

a designation unit constructed to accept a designated color from a user; and a color conversion unit constructed to mono-colorize the compressed image data without decompressing the compressed image data by converting at least one of (a) the representation color and (b) one of the other colors into the designated color based on the pattern flag.

* * * * *